US011758633B2

(12) United States Patent
Dupras et al.

(10) Patent No.: US 11,758,633 B2
(45) Date of Patent: Sep. 12, 2023

(54) METHOD AND SYSTEM FOR GENERATING A DYNAMIC LIGHTING SCENARIO

(71) Applicant: SOLLUM TECHNOLOGIES INC., Montréal (CA)

(72) Inventors: Gabriel Dupras, Otterburn Park (CA); Jacques Poirier, Huntingdon (CA); François Roy-Moisan, Verdun (CA); Charles Smith, Longueuil (CA); Alban Derville, Montréal (CA); Danny Bouthot, Saint-Hubert (CA); Louis Brun, Mont-Royal (CA); Guillaume Tourville, Montréal (CA)

(73) Assignee: SOLLUM TECHNOLOGIES INC., Montréal (CA)

( * ) Notice: Subject to any disclaimer, the term of this patent is extended or adjusted under 35 U.S.C. 154(b) by 0 days.

(21) Appl. No.: 17/294,373

(22) PCT Filed: Nov. 15, 2019

(86) PCT No.: PCT/CA2019/051633
§ 371 (c)(1),
(2) Date: May 14, 2021

(87) PCT Pub. No.: WO2020/097738
PCT Pub. Date: May 22, 2020

(65) Prior Publication Data
US 2022/0015210 A1  Jan. 13, 2022

Related U.S. Application Data

(60) Provisional application No. 62/768,514, filed on Nov. 16, 2018.

(51) Int. Cl.
*H05B 47/11* (2020.01)
*H05B 47/155* (2020.01)
(Continued)

(52) U.S. Cl.
CPC .......... *H05B 47/11* (2020.01); *H05B 47/155* (2020.01); *H05B 47/165* (2020.01); *A01G 7/045* (2013.01)

(58) Field of Classification Search
CPC .... H05B 47/11; H05B 47/155; H05B 47/165; A01G 7/045; Y02B 20/40; Y02P 60/14
See application file for complete search history.

(56) References Cited

U.S. PATENT DOCUMENTS 5,589,741 A 12/1996 Terman et al.
9,220,202 B2 12/2015 Maxik et al.
(Continued)

FOREIGN PATENT DOCUMENTS

WO 2008120127 A1 10/2008
WO WO-2008120127 A1 * 10/2008 ......... H05B 33/0863
(Continued)

OTHER PUBLICATIONS

SA Canadian Intellectual Property Office, International Search Report Issued in Application No. PCT/CA2019/051633, dated Dec. 10, 2019, WIPO, 3 pages.
(Continued)

*Primary Examiner* — Daniel D Chang
(74) *Attorney, Agent, or Firm* — McCoy Russell LLP

(57) ABSTRACT

Methods and systems are provided for generating a dynamic lighting scenario over a scenario timeline using solid-state light emitters. The method can include a step of providing a plurality of lighting reference points in the dynamic lighting scenario, each lighting reference point having an associated reference illumination state to be achieved at a corresponding reference moment of the scenario timeline. The method can also include a step of determining a plurality of sets of reference control parameters for the solid-state light emitters, each set of reference control parameters for producing
(Continued)

the reference illumination state associated to a corresponding one of the plurality of lighting reference points. The method can also include driving the solid-state light emitters based on the plurality of reference control parameters to generate the dynamic lighting scenario.

21 Claims, 11 Drawing Sheets

(51) Int. Cl.
*H05B 47/165* (2020.01)
*A01G 7/04* (2006.01)

(56) References Cited

U.S. PATENT DOCUMENTS

| | | | |
|---|---|---|---|
| 9,674,917 B1 * | 6/2017 | Sooch | ............... H05B 47/115 |
| 2015/0181678 A1 | 6/2015 | Sachs et al. | |
| 2017/0359879 A1 | 12/2017 | Eisele et al. | |
| 2018/0014375 A1 | 1/2018 | Dupras et al. | |

FOREIGN PATENT DOCUMENTS

| | | | |
|---|---|---|---|
| WO | 2009087537 A2 | 7/2009 | |
| WO | 2018052572 A1 | 3/2018 | |
| WO | WO-2018052572 A1 * | 3/2018 | ............ G06F 3/048 |

OTHER PUBLICATIONS

SA Canadian Intellectual Property Office, Written Opinion of the International Searching Authority Issued in Application No. PCT/CA2019/051633, dated Dec. 10, 2019, WIPO, 5 pages.

European Patent Office, Extended European Search Report Issued in Application No. 19884263.5, dated Jul. 6, 2022, Germany, 13 pages.

* cited by examiner

METHOD AND SYSTEM FOR GENERATING A DYNAMIC LIGHTING SCENARIO

CROSS REFERENCE TO RELATED APPLICATION

The present application is a U.S. National Phase of International Application No. PCT/CA2019/051633 entitled "METHOD AND SYSTEM FOR GENERATING A DYNAMIC LIGHTING SCENARIO," and filed on Nov. 15, 2019. International Application No. PCT/CA2019/051633 claims priority to U.S. Provisional Patent Application No. 62/768,514 filed on Nov. 16, 2018. The entire contents of each of the above-listed applications are hereby incorporated by reference for all purposes.

TECHNICAL FIELD

The technical field generally relates to lighting, and more particularly concerns a method and system to generate a dynamic lighting scenario.

BACKGROUND AND SUMMARY

LED-based lighting system reproducing natural light are useful for a variety of applications. By way of example, natural light in work or learning environments can increase productivity and provide health benefits. Natural lighting systems can also be of great interest for agricultural applications, as the characteristics of the light illuminating plants or other agricultural products can have significant impact on their health and production.

Lighting systems or lamps reproducing the spectrum of natural sun light are known in the art. Referring to FIG. 1 (PRIOR ART), there is shown a multi-channel lighting system with a plurality of light-emitting diodes (LEDs), such as described in co-assigned U.S. Pat. Appl. Pub. No. US 2018/0014375 A1 (DUPRAS et al.), the entire disclosure of which is incorporated herein by reference. This lighting system can be used to reproduce or match natural light spectra, such as for example shown in FIGS. 2A to 2C (PRIOR ART). In this reference, the infrared and ultraviolet parts of the spectrum are deliberately excluded for applications where light at those wavelengths is considered undesirable or unnecessary, but the disclosed system can also be used to generate light including these spectral components.

The spectral characteristics of natural sunlight reaching the Earth are not constant—they vary geographically according to latitude and longitude, and for a given geographical location they vary over the course of the year, and over the course of a given day. Meteorological conditions also affect natural light spectra. For example, even minor variations in spectral distribution and/or intensity can significantly affect plant production, notably in terms of growth speed, yield, and quality.

For some applications, it could be useful to mimic natural light conditions in a given part of the world, date and time of the day. It could also be useful to provide a dynamic variation in the generated light, for example by providing conditions that evolve in a similar fashion as a day outside, from sunrise to sunset.

U.S. Pat. No. 9,220,202 B2 (MAXIK et al.), the entire disclosure of which is incorporated herein by reference, discloses a method to control the circadian rhythm of plants by changing the spectrum of light generated by a multi-LEDs system, for example by providing settings for simulating dusk or dawn. The generation of different spectra is done by adding different ratios of blue LEDs between 380 and 480 nm. MAXIK et al. however do not address the issue of transitioning from one spectrum to the next or provide information on LED driving conditions associated with a dynamic lighting schedule.

There remains a need for a method or system that can provide improvements in systems and methods generated light reproducing natural light conditions.

In accordance with one aspect, there is provided a method for generating a dynamic lighting scenario over a scenario timeline using solid-state light emitters, the method including: providing a plurality of lighting reference points in the dynamic lighting scenario, each lighting reference point having an associated reference illumination state to be achieved at a corresponding reference moment of the scenario timeline; determining a plurality of sets of reference control parameters for the solid-state light emitters, each set of reference control parameters for producing the reference illumination state associated to a corresponding one of the plurality of lighting reference points; and driving the solid-state light emitters based on the plurality of reference control parameters to generate the dynamic lighting scenario.

In some embodiments, the method further includes determining a plurality of set of intervening control parameters for the solid-state light emitters, each set of intervening control parameters for providing transition illumination between the reference illumination states of a corresponding pair of successive lighting reference points of the dynamic lighting scenario; and driving the solid-state light emitters based on the plurality of set of intervening control parameters to produce the transition illumination.

In some embodiments, said determining the plurality of sets of reference control parameters for the solid-state light emitters is based on calibration data.

In some embodiments, said determining the plurality of sets of reference control parameters for the solid-state light emitters is further based on calculation data obtained from said calibration data.

In some embodiments, said determining the plurality of sets of reference control parameters for the solid-state light emitters includes providing a database mapping a plurality of predefined sets of control parameters for the solid-state light emitters to a corresponding plurality of basis illumination states; and accessing the database and, for each reference illumination state to be achieved: assessing the reference illumination state to be achieved in view of the plurality of basis illumination states; and selecting, in view of said assessing, the set of reference control parameters based on the plurality of predefined sets of reference control parameters.

In some embodiments, for one of the reference illumination states to be achieved, said assessing includes finding a match between the reference illumination state and one of the basis illumination states, and said selecting includes using, as the set of reference control parameters for producing the reference illumination state, the predefined set of control parameters corresponding to the matching basis illumination state.

In some embodiments, for one of the reference illumination states to be achieved, said assessing includes representing the reference illumination state as a combination of two or more of the basis illumination states, and said selecting includes selecting, in view of said combination, the set of reference control parameters for producing the reference illumination state based on the plurality of predefined sets of control parameters.

In some embodiments, the combination includes an estimation, an approximation, an interpolation or an extrapolation of the two or more basis illumination states.

In some embodiments, the reference illumination states are defined by an illumination spectrum, a color temperature, a light intensity, or any combination thereof.

In some embodiments, the color temperature ranges from about 1500 K to about 8000 K.

In some embodiments, at least one of the reference illumination states encompasses visible light wavelengths.

In some embodiments, at least one of the reference illumination states encompasses non-visible light wavelengths.

In some embodiments, at least one of the reference illumination states is representative of natural light.

In some embodiments, the natural light includes sunlight.

In some embodiments, at least one of the reference illumination states is representative of artificial light.

In some embodiments, the dynamic lighting scenario is representative of a diurnal illumination cycle or a portion thereof.

In some embodiments, the scenario timeline is defined in terms of Earth-based time units.

In some embodiments, further includes initiating said step of driving the solid-state light emitters only after said step of providing the plurality of lighting reference points in the dynamic lighting scenario and said step of determining the plurality of sets of reference control parameters for the solid-state light emitters have ended.

In some embodiments, the method further includes initiating said step of driving the solid-state light emitters before said step of providing the plurality of lighting reference points in the dynamic lighting scenario and said step of determining the plurality of sets of reference control parameters for the solid-state light emitters have ended.

In some embodiments, the method further includes generating at least one subsequent dynamic lighting scenario different from the dynamic lighting scenario, the dynamic lighting scenario and said at least one subsequent dynamic lighting scenario forming a dynamic lighting recipe.

In some embodiments, the method further includes modifying at least one upcoming characteristic of the dynamic lighting scenario associated with a future time or time period within said scenario timeline.

In some embodiments, said modifying is based on weather forecast data.

In some embodiments, said at least one upcoming characteristic includes a number of remaining reference moments of said scenario timeline, a remaining duration of said dynamic lighting scenario, and a reference illumination state to be achieved at a future reference moment.

In some embodiments, the method further includes momentarily driving the solid-state light emitters to generate at least one event during the dynamic lighting scenario, said at least one event introducing a transient perturbation in said dynamic lighting scenario.

In some embodiments, said at least one event is generated at a preprogrammed time within said scenario timeline.

In some embodiments, said at least one event is generated at a random time within said scenario timeline.

In some embodiments, said at least one event is representative of a weather condition.

In accordance with another aspect, there is provided a lighting system for generating a dynamic lighting scenario over a scenario timeline, the lighting system including an illumination unit including multiple solid-state light emitters; and a control and processing unit configured for providing a plurality of lighting reference points in the dynamic lighting scenario, each lighting reference point having an associated reference illumination state to be achieved at a corresponding reference moment of the scenario timeline; determining a plurality of set of reference control parameters for the solid-state light emitters, each set of reference control parameters for producing the reference illumination state associated to a corresponding one of the plurality of reference points; and driving the solid-state light emitters based on the plurality of reference control parameters to generate the dynamic lighting scenario.

In some embodiments, the solid-state light emitters include light-emitting diodes.

In some embodiments, the solid-state light emitters are part of a lamp, the lamp including part of the control and processing unit.

In some embodiments, the processor is further configured for determining a plurality of set of intervening control parameters for the solid-state light emitters, each set of intervening control parameters for providing transition illumination between the reference illumination states of a corresponding pair of successive lighting reference points of the dynamic lighting scenario; and driving the solid-state light emitters based on the plurality of set of intervening control parameters to produce the transition illumination.

In some embodiments, said determining the plurality of sets of reference control parameters for the solid-state light emitters is based on calibration data.

In some embodiments, said determining the plurality of sets of reference control parameters for the solid-state light emitters is further based on calculation data obtained from said calibration data.

In some embodiments, said determining the plurality of sets of reference control parameters for the solid-state light emitters includes providing a database mapping a plurality of predefined sets of control parameters for the solid-state light emitters to a corresponding plurality of basis illumination states; and accessing the database and, for each reference illumination state to be achieved assessing the reference illumination state to be achieved in view of the plurality of basis illumination states; and selecting, in view of said assessing, the set of reference control parameters based on the plurality of predefined sets of reference control parameters.

In some embodiments, for one of the reference illumination states to be achieved, said assessing includes finding a match between the reference illumination state and one of the basis illumination states, and said selecting includes using, as the set of reference control parameters for producing the reference illumination state, the predefined set of control parameters corresponding to the matching basis illumination state.

In some embodiments, for one of the reference illumination states to be achieved, said assessing includes representing the reference illumination state as a combination of two or more of the basis illumination states, and said selecting includes selecting, in view of said combination, the set of reference control parameters for producing the reference illumination state based on the plurality of predefined sets of control parameters.

In some embodiments, the combination includes an estimation, an approximation, an interpolation or an extrapolation of the two or more basis illumination states.

In some embodiments, the reference illumination states are defined by an illumination spectrum, a color temperature, a light intensity, or any combination thereof.

In some embodiments, the color temperature ranges from about 1500 K to about 8000 K.

In some embodiments, at least one of the reference illumination states encompasses visible light wavelengths.

In some embodiments, at least one of the reference illumination states encompasses non-visible light wavelengths.

In some embodiments, at least one of the reference illumination states is representative of natural light.

In some embodiments, the natural light includes sunlight.

In some embodiments, at least one of the reference illumination states is representative of artificial light.

In some embodiments, the dynamic lighting scenario is representative of a diurnal illumination cycle or a portion thereof.

In some embodiments, the scenario timeline is defined in terms of Earth-based time units.

In some embodiments, the processor is further configured for initiating said step of driving the solid-state light emitters only after said step of providing the plurality of lighting reference points in the dynamic lighting scenario and said step of determining the plurality of sets of reference control parameters for the solid-state light emitters have ended.

In some embodiments, the processor is further configured for initiating said step of driving the solid-state light emitters before said step of providing the plurality of lighting reference points in the dynamic lighting scenario and said step of determining the plurality of sets of reference control parameters for the solid-state light emitters have ended.

In some embodiments, the processor is further configured for generating at least one subsequent dynamic lighting scenario different from the dynamic lighting scenario, the dynamic lighting scenario and said at least one subsequent dynamic lighting scenario forming a dynamic lighting recipe.

In some embodiments, the processor is further configured for modifying at least one upcoming characteristic of the dynamic lighting scenario associated with a future time or time period within said scenario timeline.

In some embodiments, said modifying is based on weather forecast data.

In some embodiments, said at least one upcoming characteristic includes a number of remaining reference moments of said scenario timeline, a remaining duration of said dynamic lighting scenario, and a reference illumination state to be achieved at a future reference moment.

In some embodiments, the processor is further configured for momentarily driving the solid-state light emitters to generate at least one event during the dynamic lighting scenario, said at least one event introducing a transient perturbation in said dynamic lighting scenario.

In some embodiments, said at least one event is generated at a preprogrammed time within said scenario timeline.

In some embodiments, said at least one event is generated at a random time within said scenario timeline.

In some embodiments, said at least one event is representative of a weather condition.

In accordance with one aspect, there is provided a non-transitory computer readable storage medium having stored thereon computer executable instructions that, when executed by a processor, cause the processor to perform the method of as herein presented.

In accordance with another aspect, there is provided a computer device for controlling an illumination unit including multiple solid-state light emitters to generate a dynamic lighting scenario over a scenario timeline, the computer device including: a processor; and the non-transitory computer readable storage medium as herein presented, the non-transitory computer readable storage medium being operatively coupled to the processor.

In accordance with another aspect, there is provided a method for generating a dynamic lighting scenario using a lamp having multiple LEDs, including:
  a. providing a plurality of lighting reference points each characterizing the light scenario at a corresponding reference moment, each reference point defining a light spectrum and light intensity;
  b. for each of the reference points, determining a corresponding set of reference LED control parameters for the multiple LEDs, based on calibration data;
  c. calculating intervening LED control parameters providing a transition between the reference points;
  d. driving the multiple LEDs according to said reference LED control parameters and the intervening LED control parameters to dynamically generate light according to the lighting scenario.

In accordance with another aspect, there is also provided a lighting system for generating a dynamic lighting scenario. The lighting system includes:
  a lamp comprising:
  multiple LEDs and multiple drivers each associated with one of the multiple LEDs; and
  one or more controllers configured for:
    providing a plurality of lighting reference points each characterizing the light scenario at a corresponding reference moment, each reference point defining a light spectrum and light intensity;
    for each of the reference points, determining a corresponding set of reference LED control parameters for the multiple LEDs, based on calibration data;
    calculating intervening LED control parameters providing a transition between the reference points; and
    driving the multiple LEDs according to the reference LED control parameters and the intervening LED control parameters to dynamically generate light according to the lighting scenario.

Advantageously, embodiments of the method and system described herein may provide versatility in the reproduction of natural light, and a greater adaptability in the spectral content of the emitted light. In some implementations, this enables a better mimicking of actual natural light conditions experienced outdoors, which is full of nuances that conventional systems and methods may not address. Embodiments of the present system and method can also facilitate the reproduction of natural light at different locations on the Earth, day of the year and time of day.

It is to be noted that other method and process steps may be performed prior, during or after the steps described herein. The order of one or more steps may also differ, and some of the steps may be omitted, repeated and/or combined, depending on the application.

Other features and advantages of the method and system described herein will be better understood upon a reading of preferred embodiments thereof with reference to the appended drawings. Although specific features described in the above summary and in the detailed description below may be described with respect to specific embodiments or aspects, it should be noted that these specific features can be combined with one another unless stated otherwise.

DETAILED DESCRIPTION

Figure 1:
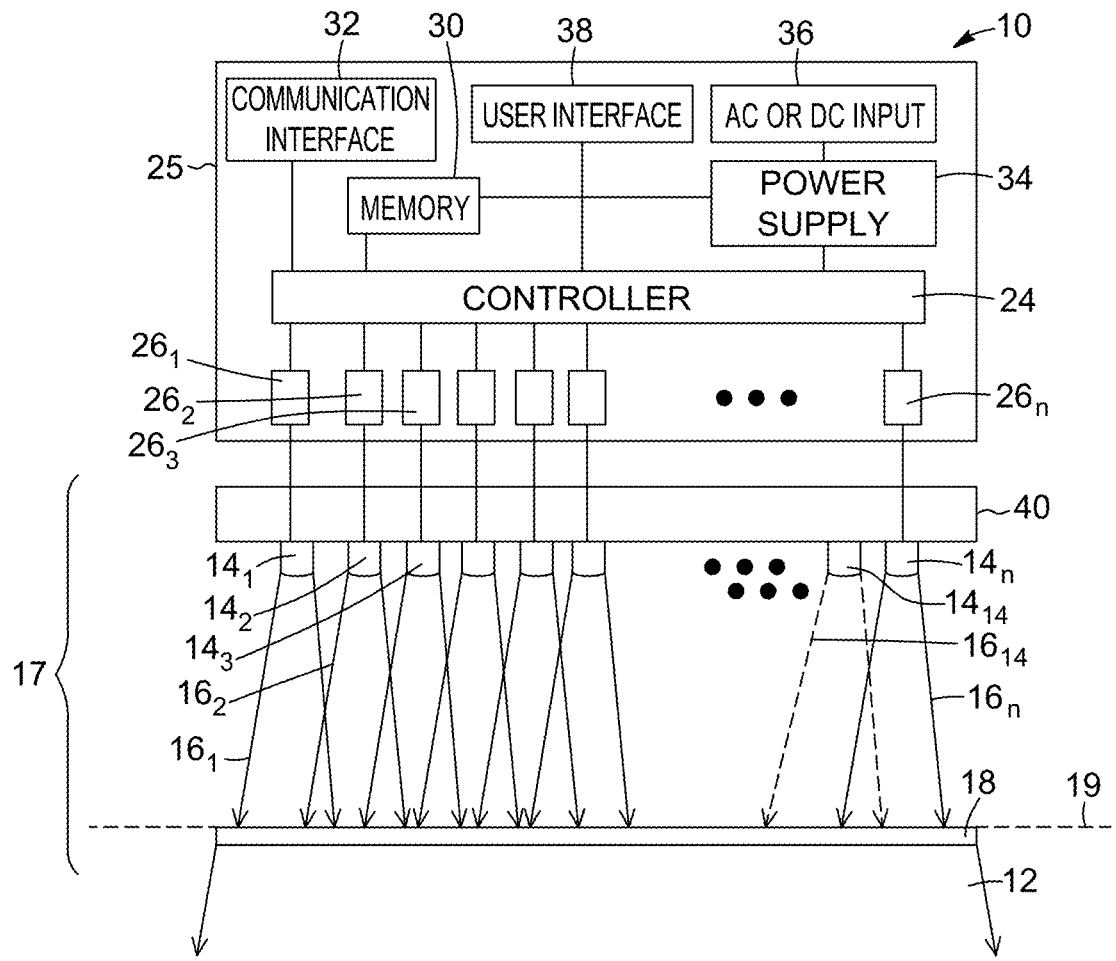
FIG. 1 (PRIOR ART) shows a multi-channel lighting system with a plurality of LEDs.
Figure 2A:
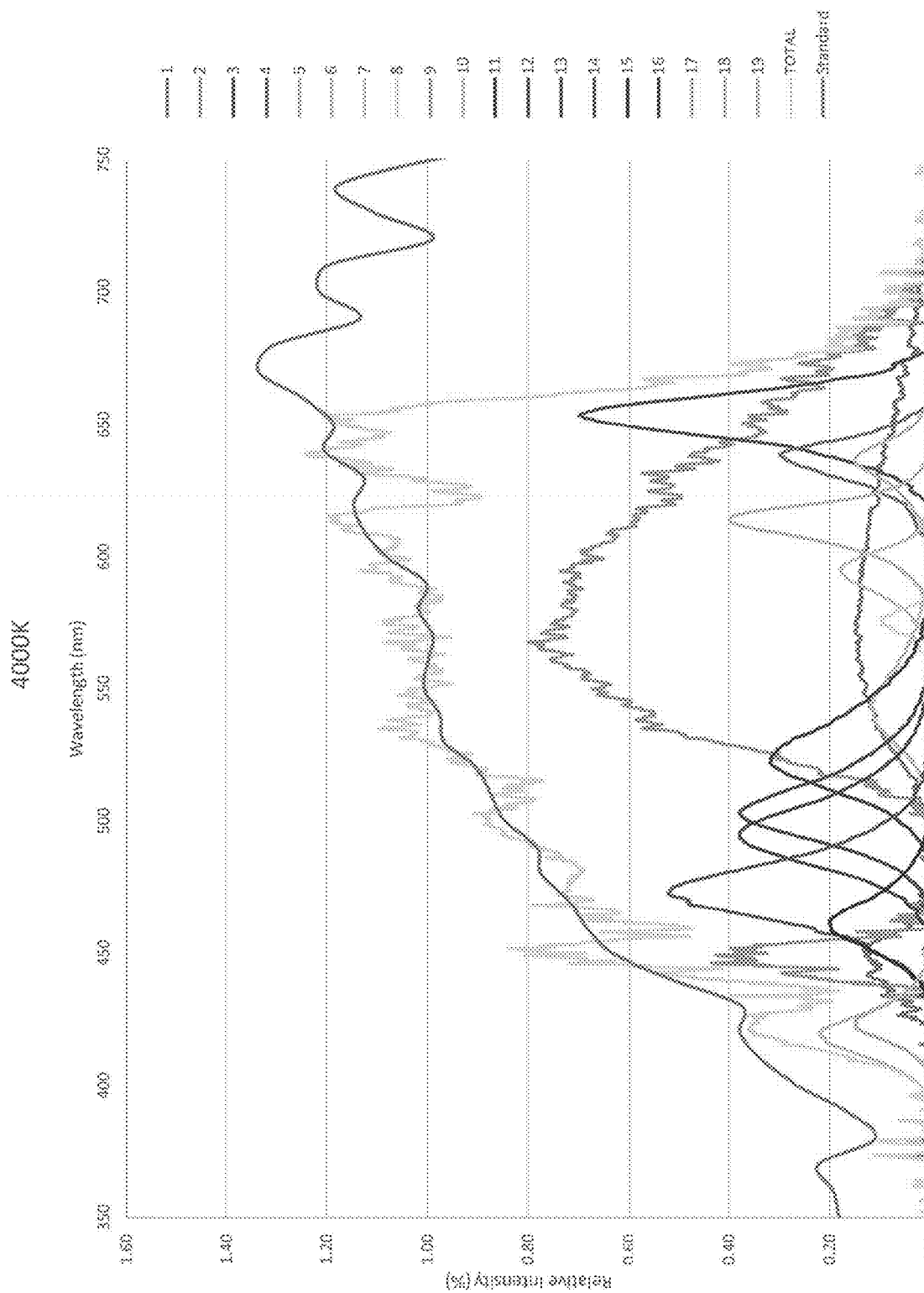
FIGS. 2A-2C (PRIOR ART) show different spectra that can be generated with the system illustrated in FIG. 1.
Figure 2B:
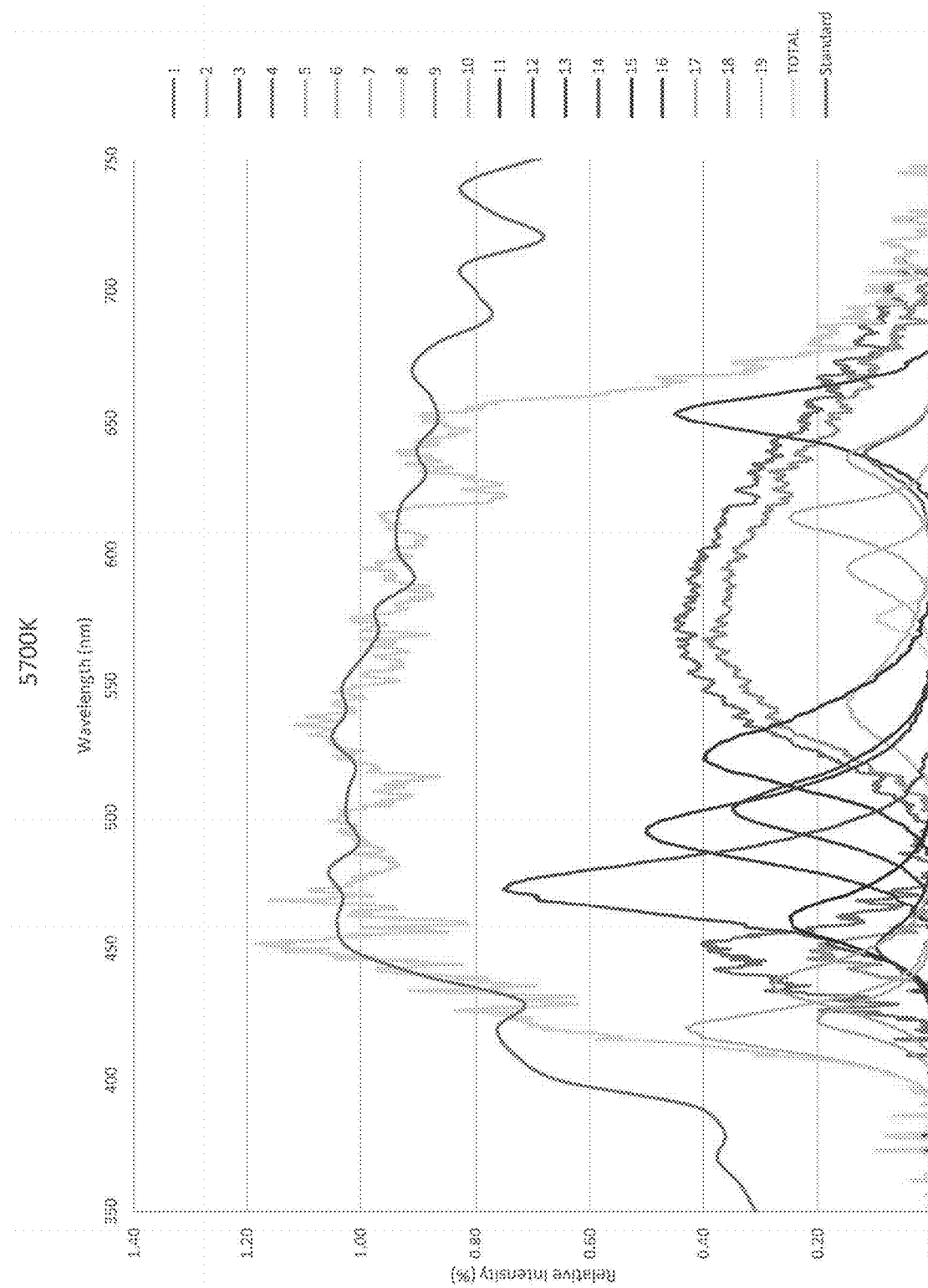
Figure 2C:
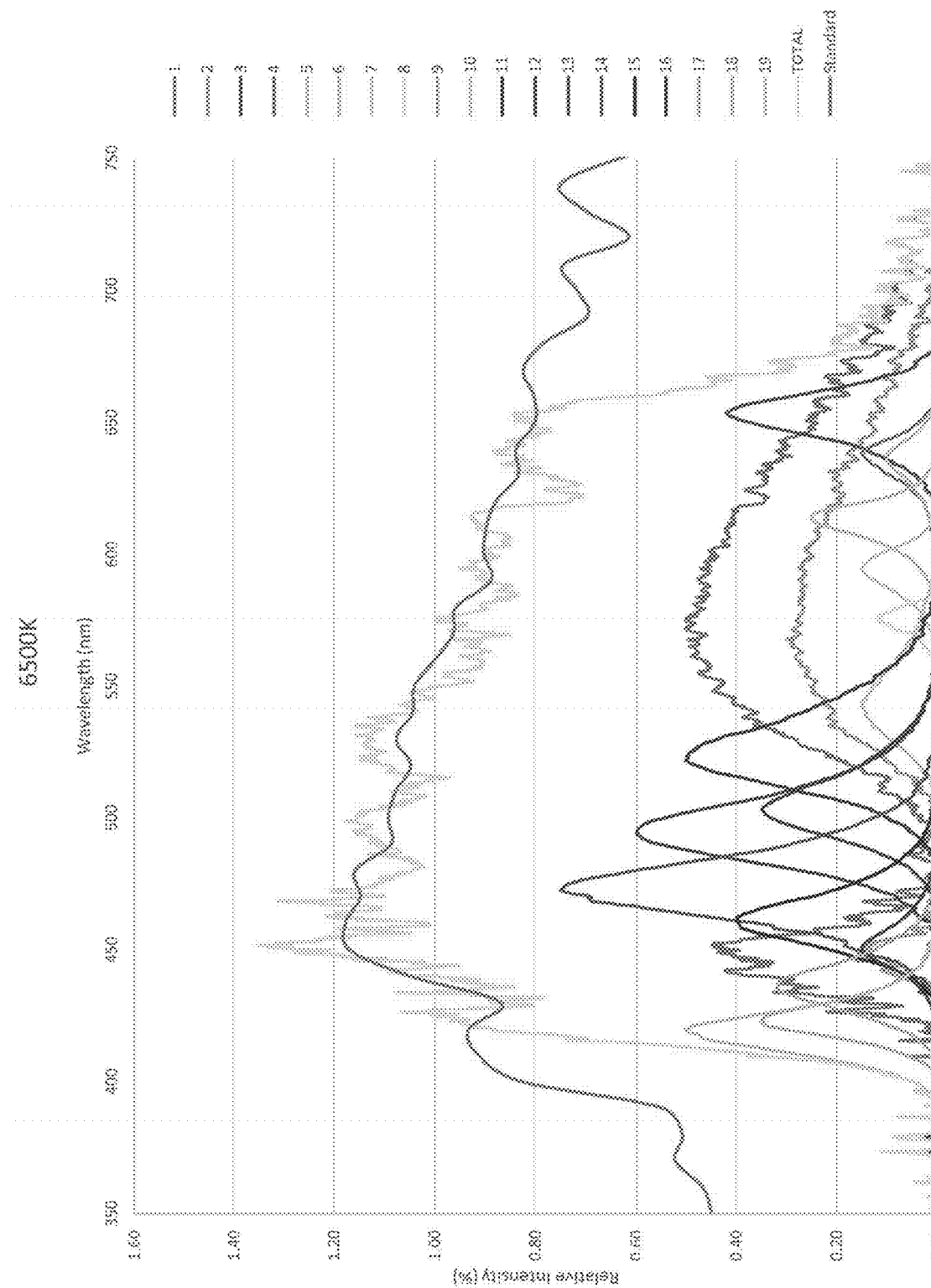

In the present description, similar features in the drawings have been given similar reference numerals. To avoid cluttering certain figures, some elements may not have been indicated if they were already identified in a preceding figure. It should also be understood that the elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. More particularly, it will be understood that such spatially relative terms are intended to encompass different orientations in the use or operation of the present embodiments, in addition to the orientations exemplified in the figures.

Unless stated otherwise, the terms "connected" and "coupled", and derivatives and variants thereof, refer herein to any structural or functional connection or coupling, either direct or indirect, between two or more elements. For example, the connection or coupling between the elements may be mechanical, optical, electrical, thermal, logical, or any combination thereof.

The terms "a", "an" and "one" are defined herein to mean "at least one", that is, these terms do not exclude a plural number of items, unless stated otherwise.

Terms such as "substantially", "generally" and "about", that modify a value, condition or characteristic of a feature of an exemplary embodiment, should be understood to mean that the value, condition or characteristic is defined within tolerances that are acceptable for the proper operation of this exemplary embodiment for its intended application.

Likewise, the terms "match", "matching" and "matched" are intended to refer herein to a condition in which two elements are either the same or within some predetermined tolerance of each other. That is, these terms are meant to encompass not only "exactly" or "identically" matching the two elements but also "substantially", "approximately" or "subjectively" matching the two elements, as well as providing a higher or best match among a plurality of matching possibilities.

In the present description, the expression "based on" is intended to mean "based at least partly on", that is, this expression can mean "based solely on" or "based partially on", and so should not be interpreted in a limited manner. More particularly, the expression "based on" could also be understood as meaning "depending on", "representative of", "indicative of", "associated with" or similar expressions.

The present description generally relates to a method and a system for generating a dynamic lighting scenario over a scenario timeline using solid-state light emitters.

The present techniques have potential use in various applications that may require or benefit from dynamic lighting conditions or lighting conditions changing over time. Non-limiting examples of possible fields of use include horticulture, agriculture and other grow light applications, animal husbandry, industrial lighting, commercial lighting, outdoor lighting, household lighting, workplace and learning environment lighting (where natural light can increase productivity and provide health benefit), vehicle lighting, human-centric lighting, medical lighting, and the like.

In the present description, the terms "light" and "optical", and variants and derivatives thereof, are used to refer to radiation in any appropriate region of the electromagnetic spectrum. The terms "light" and "optical" are therefore not limited to visible light, but can also include, without being limited to, the infrared and ultraviolet regions. For example, in some implementations, the present techniques can be used with electromagnetic signals having wavelengths ranging from about 250 nm to about 2500 nm, for example between 250 nm and 1500 nm. However, this range is provided for illustrative purposes only and some implementations of the present techniques may operate outside this range. Also, the skilled person will appreciate that the definition of the ultraviolet, visible and infrared ranges in terms of spectral ranges, as well as the dividing lines between them, can vary depending on the technical field or the definitions under consideration, and are not meant to limit the scope of applications of the present techniques.

In the present description, the expressions "natural light" or "natural light conditions" generally refer to light having spectral characteristics corresponding or similar to those of sunlight, moonlight or starlight. The spectral profile of natural light, particularly sunlight, varies as a function of geographic location, time of day, time of year, weather, cloud coverage, and several other factors. Several standards are known in the art to provide a spectral reference for natural light. For example, the Commission internationale de l'éclairage (CIE) has established the D series of well-defined daylight standard illuminants representing natural light under different conditions. One well-known standard is CIE Standard Illuminant D65, which is a daylight illuminant that intends to represent the average midday light in Western or Northern Europe. Other examples of CIE Standard Illuminants for daylight include the D50, D55, and D75 standard illuminants. Sunlight, which refers to the total spectrum of electromagnetic radiation emitted by the Sun and reaching the Earth, has a broad spectral range including ultraviolet radiation, visible light, and infrared radiation. Accordingly, standard illuminants extend within the solar radiation spectrum. For example, Standard Illuminant D65 extends from 300 nm to 830 nm. Non-limiting examples of natural light sources include sunlight, moonlight, starlight, twilight, lightning, and firelight. Non-limiting examples of artificial light sources include incandescent light sources, fluorescent light sources, high-intensity discharge (HID) light sources such as mercury vapor, metal halide (MH), high-pressure sodium (HPS) and low-pressure sodium (LPS) light sources, solid-state light sources including LED light sources, and laser sources.

In the present description, the term "solid-state light emitter" refers to any light-emitting device that converts electrical energy into electromagnetic radiation through the recombination of electronic carriers (i.e., electrons and holes) in a light emitting layer or region. The emitting layer or region can include, but is not limited to, silicon, silicon carbide, gallium nitride and/or other semiconductor materials, and may or may not include a substrate such as sapphire, silicon, silicon carbide and/or other microelectronic substrates. The solid-state light emitters can include both inorganic and organic light emitters, many of which are known to the skilled person and need not be described in detail herein. Non-limiting examples of types of solid-state light emitters include semiconductor light-emitting diodes (LEDs), semiconductor laser diodes, vertical cavity surface emitting lasers (VCSELs), other semiconductor light emitting devices or lamps, organic light-emitting diodes (OLEDs), and polymer light-emitting diode (PLEDs).

In the present description, the term "illumination spectrum" is used to broadly refer to the spectral power distribution of an illumination. The illumination spectrum can represent the distribution of power radiated per unit area and per unit wavelength or frequency over a spectral region of the electromagnetic spectrum.

The expression "dynamic lighting scenario" is understood to refer to the generation of light, such as for illuminating purposes, having optical characteristics (e.g., spectral content, intensity, polarization) that vary or evolve over time during a given time period. The optical characteristics of the generated light may correspond to or emulate those of natural lighting conditions. It is one aspect of the method described herein that in some embodiments, the natural light may emulate or be inspired from the actual light conditions experienced at a specific geographical location, date and time. It is appreciated that devising dynamic lighting scenarios that combine natural light conditions corresponding to different geographical locations is possible in some applications (e.g., a scenario could be build using sunrise, midday and sunset conditions corresponding to three distinct locations on Earth, at the same or different dates). In other embodiments, however, the natural light conditions may be different from real life conditions on Earth. By way of example, the spectrum of natural light generated according to the method described herein may differ from an actual spectral content of sunlight due to the absence of spectral components which are undesired or unnecessary in a given application context, or conversely by the enhancement or addition of wavelengths then are considered advantageous or required. More particularly, the present techniques allow achieving reference illumination states with solid-state light emitters, the solid-state light emitters being driven to produce the dynamic lighting scenario using sets of reference control parameters. In some embodiments, the method also provides transition illumination between reference illumination states, as it will be described in greater detail.

In some embodiments, the dynamic lighting scenario may emulate lighting conditions over the course of a day, from dawn to dusk, or over a portion of a day. Indeed, the spectral contents of light reaching a particular location on earth from the Sun is not constant as the day progress. In some instances, it can be customary to characterize natural light according to its Correlated Color Temperature (CCT) value, expressed in Kelvin (K). By convention, the CCT is defined by the CIE as "the temperature of the Planckian radiator whose perceived color most closely resembles that of a given stimulus at the same brightness and under specified viewing conditions" (CIE/IEC 17.4:1987, International Lighting Vocabulary). Lower CCT values correspond to "warmer" light. Hence, a day with a clear blue sky can begin at dawn with light in a warm CCT spectrum range, such as between 1500K and 3000K, then progress to about 5000K to 7500K at mid-day and return to the 1500K to 3000K range towards dusk. It is appreciated that CCT is a characteristic of visible light, which may not be appropriate to describe illumination states encompassing non-visible light only. In some implementations, the light characteristics, namely the optical characteristics of various reference or transitory illumination states to be achieved during a given dynamic lighting scenario, may be optimized in view of the context of use of the system and method. For example, in agricultural applications, the light conditions in a region of the world from which a cultivated produce originates or where this produce is known to thrive can be emulated (e.g., growing tomatoes using light conditions from a sunny day in June in Tuscany). In other examples, the lighting conditions may be adapted in view of observations or discoveries regarding optimal or enhanced lighting conditions for growing a given agricultural output, such as for example to follow the McCree Curve, which represents the average photosynthetic response of plants to light energy.

Turning to the Figures, different embodiments of a lighting system and related method for generating a dynamic lighting scenario over a scenario timeline using solid-state light emitters will now be described.

Lighting System Implementations

Figure 3A:
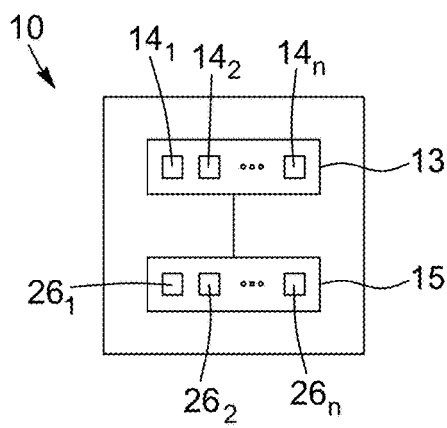
FIGS. 3A-3C illustrate embodiments of a lighting system for generating a dynamic lighting scenario over a scenario timeline using solid-state light emitters.

Referring to FIG. 3A, there is shown an embodiment of a lighting system 10 for generating a dynamic lighting scenario according to one embodiment. The lighting system 10 includes an illumination unit 13 comprising multiple solid-state light emitters 141, 142, . . . 14n (collectively referred to as the emitters 14). In some embodiments, the emitters 14 comprise light-emitting diodes.

The lighting system 10 includes a control and processing unit 15. The control and processing unit 15 can be provided within one or more general purpose computers and/or within any other suitable computing devices, implemented in hardware, software, firmware, or any combination thereof, and connected to the components of the lighting system 10 via appropriate wired and/or wireless communication links and ports. Depending on the application, the control and processing unit 15 may be integrated, partly integrated, or physically separate from the optical hardware of the lighting system 10. The control and processing unit 15 is configured to implement different steps for generating the dynamic lighting scenario. In one embodiment, the control and processing unit 15 is configured to provide a plurality of lighting reference points in the dynamic lighting scenario. Each lighting reference point has an associated reference illumination state to be achieved at a corresponding reference moment of the scenario timeline. The control and processing unit 15 is also configured to perform a step of determining a plurality of set of reference control parameters for the emitters 14. Each set of reference control parameters allows producing the reference illumination state associated to a corresponding reference point. The control and processing unit 15 is also configured to drive the emitters 14 based on the plurality of reference control parameters to generate the dynamic lighting scenario. It is to be noted that each of these steps will be described in greater detail below.

Figure 3B:
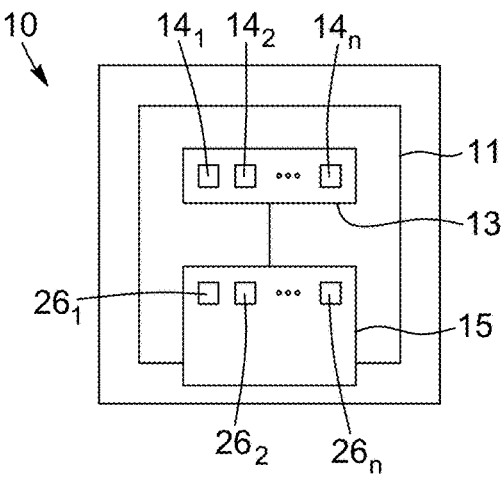

In some embodiments, the emitters 14 are part of a lamp 11. In these embodiments, the lamp 11 may include part of the control and processing unit 15, as depicted in FIG. 3B.

Figure 3C:
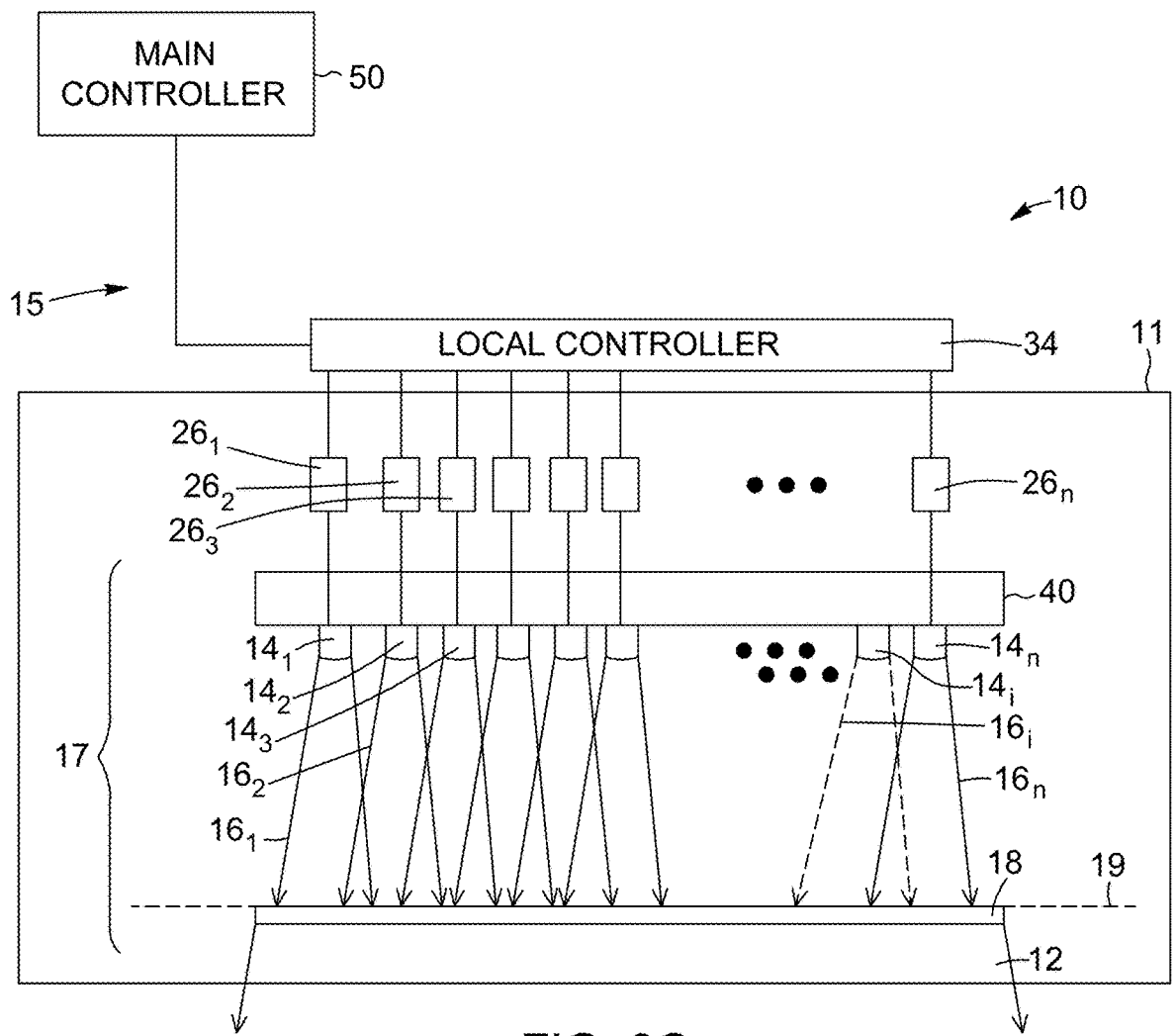

With reference to FIG. 3C, another embodiment of the lighting system 10 is illustrated. In this embodiment, the lighting system 10 includes a lamp 11 and the lamp 11 includes a plurality of emitters 14, for example LEDs (individually labeled as $14_1$, $14_2$, ..., $14_i$, ..., $14_n$). In operation, each of the emitters 14 is designed and configured to emit a corresponding light sub-beam 16, (e.g., the sub-beam $16_1$, $16_2$, ..., $16_i$, ..., $16_n$). Each light sub-beam 16, has an individual spectrum. As previously mentioned, the emitters 14 could be embodied by any other any light-emitting devices that convert electrical energy into electromagnetic radiation through the recombination of electronic carriers. As such, the embodiments illustrating the emitters 14 as being LEDs serve an illustrative purpose only.

The individual spectra of the light sub-beams 16 produced by the emitters 14 are representative of a portion of the spectrum of the output light beam 12 being generated by the lighting system 10. Each emitter 14 may therefore emit or generate visible colored light including, blue, cyan, green red, amber and/or any other visible colored light, as well as nonvisible light, for example infrared or ultraviolet light. In some implementations, each emitter 14 emits colored light, but it is to be noted that one or more emitters 14 could emit white light.

In some implementations, the individual spectrum of each emitter 14 may be selected with a center wavelength and spectral range such that the individual spectrum partially overlaps, and particularly overlaps at least at Full Width at Half Maximum (FWHM) or higher, with a spectrally adjacent individual spectrum. The expression "FWHM" is understood in the art to mean the extent of a function, given by the difference between the two extreme values of the independent variable at which the dependent variable is equal to half of its maximum value. In one example, the above condition may be achieved with emitters 14 illustratively selected having at most a 15 nm of difference from the centered wavelength of each other, with an average FWHM of about 30 nm. If emitters 14 with a wider spectrum are selected, such a difference between the centered wavelengths could be larger. The light outputted by each emitter $14_i$ may have a different spectrum than that of all the other emitters 14, or subgroups of emitters 14, adjacent or not, may have a same spectrum.

Still referring to FIG. 3C, the lighting system 10 further includes a combining assembly 17 combining the light sub-beams 16 from the emitters 14 into the output light beam 12. The combining assembly 17 is configured such that the resulting output light beam 12 has a combined spectral profile defined by a combination of the individual spectra of the plurality of emitters 14. The combining assembly 17 may include any one or a combination of mechanical, electrical and/or optical components cooperating to appropriately mix the light sub-beams 16 together. In the illustrated embodiment, the combining assembly 17 for example includes a support structure 40 on which the emitters 14 are mounted, and particularly positioned such that the sub-beams 16 project towards a diffusing plane 19. The combining assembly 17 further includes a diffuser 18 extending along the diffusing plane 19. As one skilled in the art will readily understand, the diffuser 18 may be embodied by any optical component or combination of components suitable for blending light of the sub-beams 16 into the output beam 12. The diffuser 18 may for example be embodied by sandblasted glass or plastic or other types of light mixing optics.

The diffuser may be oriented or directed to illuminate an object, surface or any target or scene of interest with the output beam 12.

In some variants, for example if the object or surface to be illuminated is sufficiently far from the lighting system 10, the combining assembly 17 may omit components to blend the light from the individual emitters 14 together and simply direct the light sub-beams 16 along a same optical path. In one example, the light emitted or generated by each emitter $14_i$ may be directed by angled reflectors or other beam-directing optics (not shown). Also, filters or coatings (not shown) on the emitters 14 or the diffuser or mixing optics 18 may be provided to eliminate or modify certain spectral components and/or creating different spectra of light.

The lighting system 10 includes multiple drivers $26_1$, $26_2$, ..., $26_i$, ..., $26_n$ (collectively referred to as the drivers 26), each associated with one or more of the multiple emitters 14. In some embodiments, such as the one illustrated in FIG. 3A, the control and processing unit 15 includes the drivers 26. However, in other embodiments, such as the ones illustrated in FIG. 3C, the lamp 11 includes the drivers 26. As can be appreciated, various arrangements for the drivers 26 are possible within the scope of the present techniques.

The drivers 26 are configured to receive driving or control parameters as input signals, as will be explained in greater detail further below. Each driver $26_i$ supplies a current to the associated emitter $14_i$ to cause the associated emitter $14_i$ to generate or output the respective light sub-beam $16_i$.

In one variant, the control module controls the solid-state light emitters according to a Pulse Width Modulation (PWM) scheme, a known method for controlling the current driven through an emitter to achieve desired intensity and/or color mixing.

As previously mentioned, the emitters 14 can be LEDs. As is generally known in the art, a typical LED generates or outputs light when a current is driven across a p-n junction in the semiconductor diode (not shown) of the LED. The intensity of the light generated by the LED is thus correlated to the amount of current driven through the diode. In embodiments where the emitters 14 are LEDs, the PWM scheme alternately pulses the LED to a full current "ON" state followed by a zero current "OFF" state. Depending on the command that is given, by controlling the variation of the duty cycle (0-100%), the average luminous power emitted by the LED increases or decreases accordingly. The intensity and the temperature of the LED may thus be controlled by the PWM signals supplied to the plurality of drivers 26. Each driver $26_i$ then sends its own PWM current pulse to its associated LED. The luminous intensity of each resulting output light sub-beam $16_i$ may be individually adjusted by independently applying particular drive currents to the respective LEDs according to the control signals from the corresponding driver $26_i$. Thus, the intensity of light from each LED may be adjusted to power the LED high or low for generating the output light beam 12. For example, the driving signals supplied by each driver $26_i$ to the corresponding LED $14_i$ is individually controlled, so that the resulting combined spectral profile of the output light beam 12 is representative of the desired overall output spectral characteristics.

In accordance with one embodiment, the frequencies of the PWM signal may also be adjustable in the range between 100 Hz to 10 kHz or even up to 100 kHz for implementing lighting functions, such as dimming, for example. A high PWM frequency may be utilized, for example and without being limitative, between 150 Hz and 1 kHz, such that the on-and-off flickering of the emitters 14 is generally not perceptible to the naked eye.

The intensities of the individual spectra of the light sub-beams 16 emitted by the emitters 14 may be dependent on different working temperatures and different PWM values. It will however be understood that the driving of the emitters 14 by the drivers 26 is not limited to the PWM approach and that other control schemes may be used. For example, a linear current signal may be provided to the emitters 14, or the electric current provided to the emitters 14 may be controlled using built-in mathematical equations and an emitter parameter database (not shown) containing information such as the emitters efficiency, intensity-temperature relations, color shift-temperature relations, the eight CCT quadrangles and/or any other relevant information, in order to individually and proportionally control the intensities of the emitters 14.

In some embodiments, the lighting system 10 further includes one or more controllers configured to provide suitable control parameters to the drivers 26. In the illustrated implementation of FIG. 3C, a local controller 34 is provided proximate or integrated to the lamp 11, whereas a main controller 50 is provided separately. The main controller 50 could alternatively be remotely located and configured to control a plurality of lamps 11, each being similar or not to the one which has been described above. It will however be understood that in other embodiments a single controller may be associated with a single lamp and perform all the associated controlling functions.

Method Implementations

Now that different embodiments of the lighting system have been described, embodiments of a method for generating a dynamic lighting scenario will be presented. It will be understood by one skilled in the art that in some variants, the method may be practiced using a lighting system such as described above, for example and without being limitative, the ones illustrated in FIGS. 3A-C. However, implementing the method using other systems may be envisioned without departing from the scope of protection.

Figure 4:
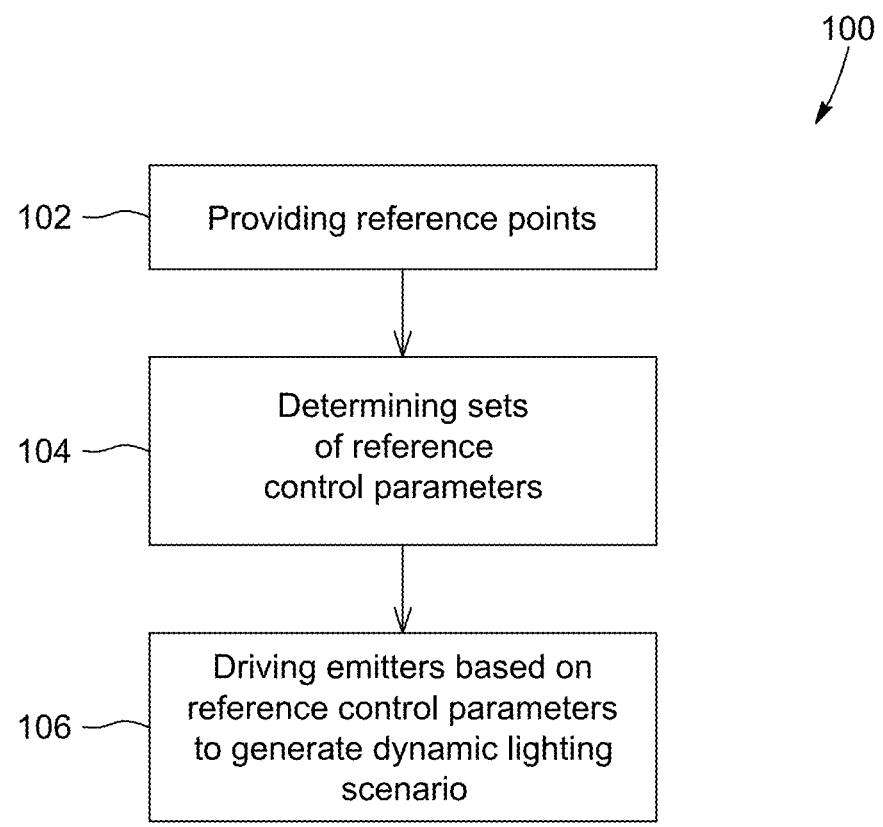
FIG. 4 is a flow chart illustrating an embodiment of a method for generating a dynamic lighting scenario over a scenario timeline using solid-state light emitters.
Figure 5:
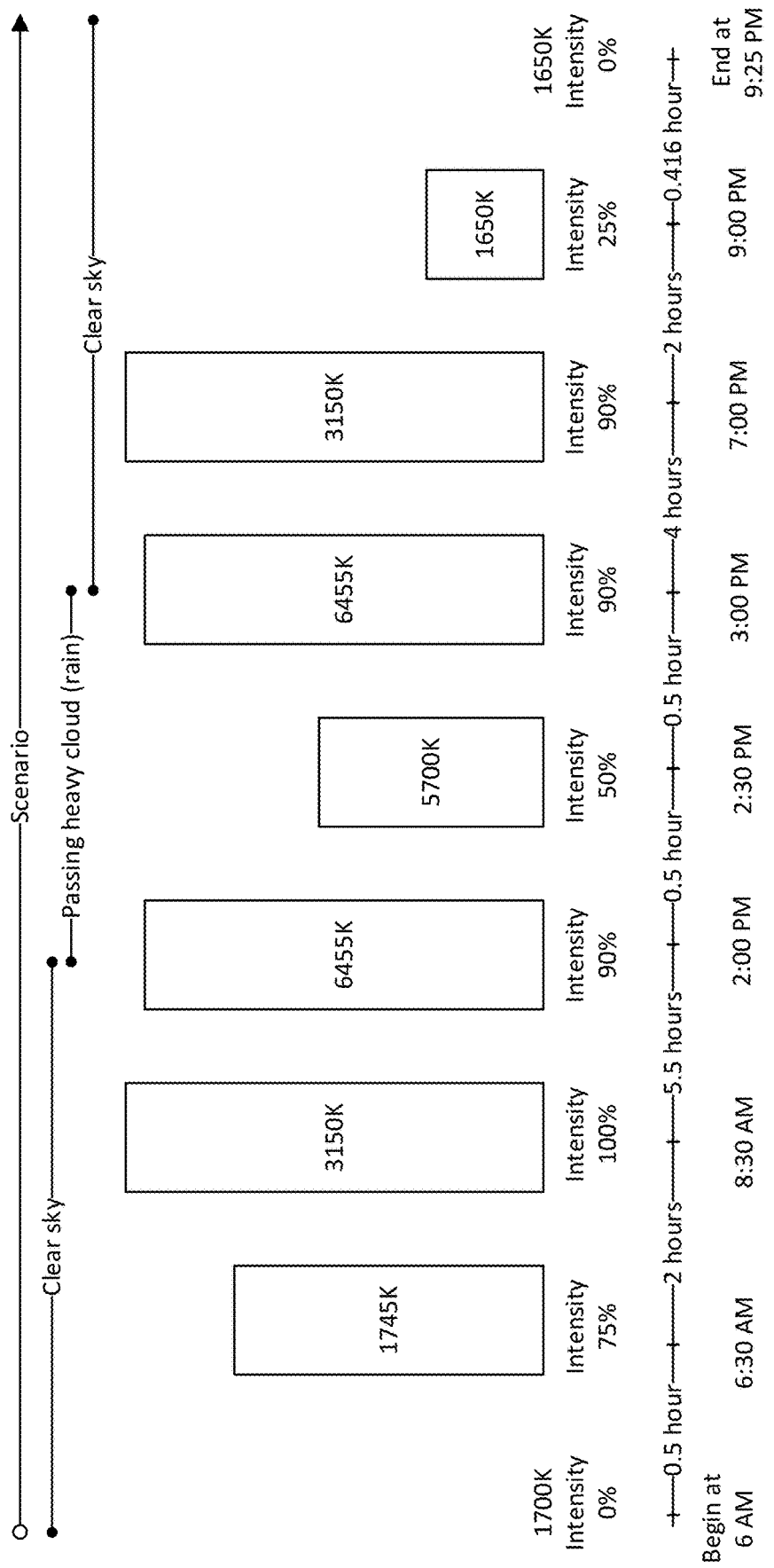
FIG. 5 shows a schematic representation of an example of a dynamic lighting scenario.

Referring to FIG. 4, a flow chart illustrating an embodiment of a method 100 for generating a dynamic lighting scenario is shown. FIG. 5 shows a schematic representation of such a dynamic lighting scenario. More particularly, FIG. 5 represents a day in which dawn begins at 6 AM and dusk ends at 9:25 PM. This scenario will be used in the current description for purposes of illustration only, and one skilled in the art will readily understand that this scenario is in no way limitative of the scope of protection. In some embodiments, the dynamic lighting scenario is representative of a diurnal illumination cycle or a portion thereof. In some embodiments, the scenario timeline is defined in terms of Earth-based time units, i.e., seconds, minutes, hours, days, weeks, months, years and the like. However, in other embodiments, the duration of the dynamic lighting scenario can be defined based on other time units (e.g., a "day" in the dynamic lighting scenario may be shorter or longer than 24 hours, and a "week" may include less or more than seven days). For example, using non-Earth-based time units (e.g., using "days" longer or shorter than 24 hours) may be relevant in cases where the scene to be illuminated is not exposed to any natural light having a 24-hour cycle. It is also possible to envision dynamic lighting scenarios where "moments" of a day, such as sunrise, midday, and sunset, are not sequenced according to their typical chronological order (i.e., sunrise, midday, sunset), or may occur more than once within a "day".

Now referring back to FIG. 4, the method 100 includes a step 102 of providing a plurality of lighting reference points in the dynamic lighting scenario (herein referred as the providing step 102). As it has been previously mentioned, each lighting reference point has an associated reference illumination state to be achieved at a corresponding reference moment of the scenario timeline.

It is to be noted that the reference illumination states can be defined by an illumination spectrum (i.e., a variation of light intensity as a function of wavelength), a color temperature, a light intensity (i.e., a luminous flux of the emitted light per solid angle), a spectral power distribution, or any suitable radiometric or photometric quantity, or any combination thereof. The reference illumination states can thus be associated with optical characteristics or properties to achieve at different reference moments of the scenario timeline. In some embodiments, the illumination state is defined by a color temperature, and the color temperature ranges from about 1000 K to about 35 000 K, for example between 1500 K and 8000 K. In some embodiments, the illumination state may correspond to a CCT value, but in some other case may not necessarily be associated with radiation form an ideal blackbody. In some embodiments, at least one of the reference illumination states encompasses visible light wavelengths. In some embodiments, at least one of the reference illumination states encompasses non-visible light wavelengths. It is to be noted that at least one of the reference illumination states can be representative of natural light or artificial light, such as defined above. One example of natural light could include, for example and without being limitative, sunlight.

In one embodiment, each lighting reference point characterizes the dynamic lighting scenario at a corresponding reference moment. As it will be explained below, points can be provided between the lighting reference points. For example, in the non-limitative scenario illustrated in FIG. 5 the reference points and reference illumination states (defined in terms of CCT and intensity parameters) are provided in Table I below:

TABLE I

Reference moments and associated reference illumination states of a possible dynamic lighting scenario

| Time | CCT | Intensity |
|---|---|---|
| 6:00AM | 1700 K | 0% |
| 6:30AM | 1745 K | 75% |
| 8:30AM | 3150 K | 100% |
| 2:00PM | 6455 K | 90% |
| 2:30PM | 5700 K | 50% |
| 3:00PM | 6455 K | 90% |
| 7:00PM | 3150 K | 90% |
| 9:00PM | 1650 K | 25% |
| 9:25PM | 1650 K | 0% |

It will be noted that in the exemplary scenario of FIG. 5, there is also provided an "event" around 2:30 PM (see Table I and FIG. 5), which will be explained in detail further below.

The method 100 further includes a step 104 of determining a plurality of sets of reference control parameters for the solid-state light emitters (herein referred as the step of determining 104). The set of reference control parameters are such that they allow producing the reference illumination state associated to a corresponding one of the plurality of lighting reference points. In some embodiments, the step of determining 104 is based on calibration data. The step of determining 104 can further be based on calculation data (e.g., experimental measurements performed to relate preset illumination states to corresponding sets of control parameters) obtained from the calibration data (e.g., analytically or numerically).

In some embodiments, the determining step 104 includes providing a database mapping a plurality of predefined sets of control parameters for the solid-state light emitters to a corresponding plurality of basis illumination states, for example a plurality of basis spectra. It is to be noted that the data included in the database can be obtained from calibration, for example and without being limitative, experimental measurements. The data could alternatively be obtained from any other methods including, but not limited to analytical methods, numerical methods, empirical models and/or any combination thereof. The step of providing the database may be followed by a step of accessing the database and then, for each reference illumination state to be achieved, a step of assessing the reference illumination state to be achieved in view of the plurality of basis illumination states. For example, the assessment can include comparing the reference illumination state to be achieved with the basis illumination states stored in the database, or finding a best match for the reference illumination state to be achieved among the stored basis illumination states. The, a step of selecting, in view of the assessing step, the set of reference control parameters based on the plurality of predefined sets of reference control parameters may be carried out.

As noted in the previous paragraph, in some embodiments, the assessing step includes, for one of the reference illumination states to be achieved, finding a match between the reference illumination state and one of the stored basis illumination states. In these embodiments, the step of selecting can include using, as the set of reference control parameters for producing the reference illumination state, the predefined set of control parameters corresponding to the basis illumination state providing a suitable match. In other embodiments, the assessing step includes, for one of the reference illumination states to be achieved, representing the reference illumination state as a combination of two or more of the basis illumination states. The combination of basis illumination states can represent a calculated illumination state, for example a calculated spectrum. In these embodiments, the step of selecting includes selecting, in view of the combination, the set of reference control parameters for producing the reference illumination state based on the plurality of predefined sets of control parameters. In some implementations, the combination includes an estimation, an approximation, an interpolation or an extrapolation of the basis illumination states. As can be appreciated, various other ways of determining the set of reference control parameters to be used to achieve a given reference illumination state from the contents of the database can be used.

In some implementations, it can be desirable or useful to provide transition illumination between the reference illumination states. In such circumstances, the method 100 includes a step of determining a plurality of set of intervening control parameters for the solid-state light emitters. Each set of intervening control parameters provides transition illumination between the reference illumination states of a corresponding pair of successive lighting reference points of the dynamic lighting scenario. The method 100 further includes driving the solid-state light emitters based on the plurality of set of intervening control parameters to produce the transition illumination.

In embodiments implemented using the lighting system of FIG. 3C, the intervening control parameters can be calculated by the local controller 31. These calculations may for example be based on an interpolation of the sets of reference control parameters used to achieve two consecutive reference illumination states. This interpolation may be linear, polynomial (Lagrange, Newton and the like), a spline, or the like. The number of sets of intervening control parameters provided between each reference point may depend of several factors, such as the desired perceived smoothness or abruptness of the transition, the extend of the variation in spectrum and/or intensity, the calculating speed of the controller, or other relevant factors.

Figure 7A:
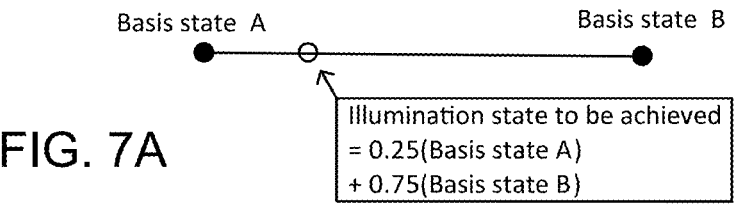
FIGS. 7A-7C show examples of the color space representing the temperature of the output light defined by a combination of basis illumination states (e.g., basis spectra) to achieve a certain reference illumination state (e.g., calculated spectrum).
Figure 7B:
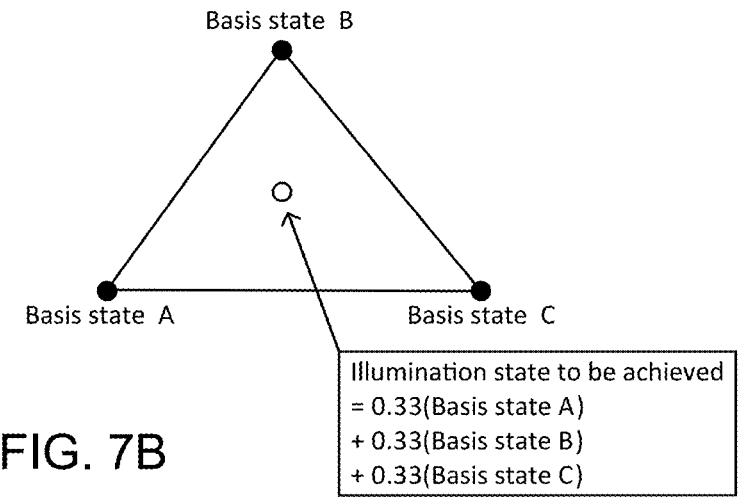
Figure 7C:
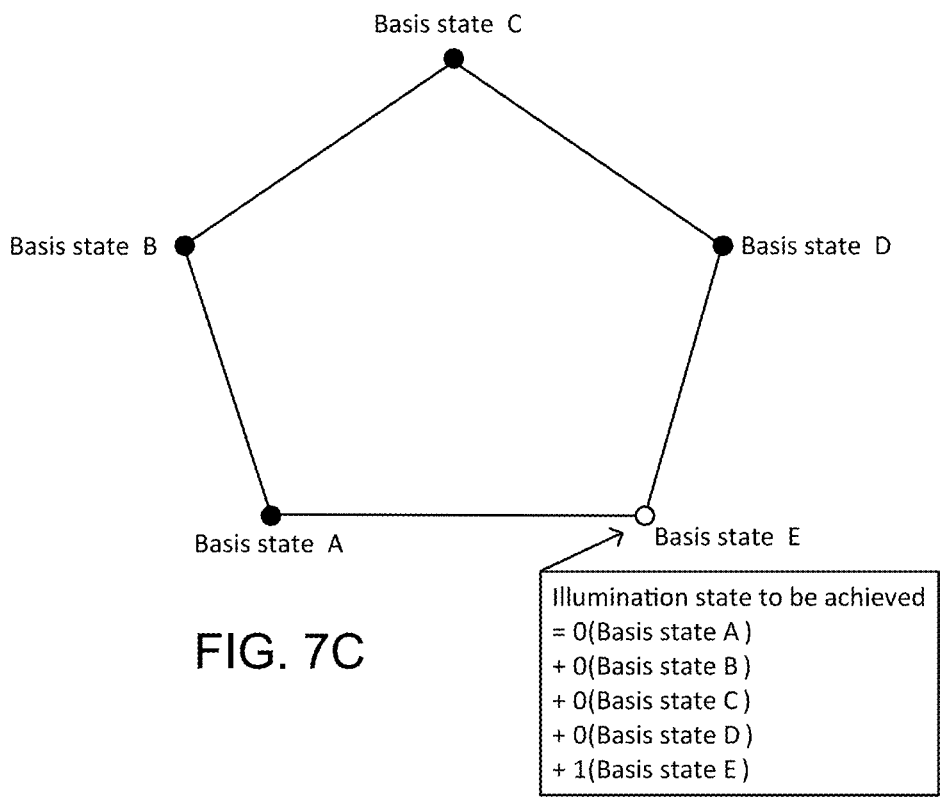

Referring to FIG. 7A-C, there are shown examples of the color space representing the temperature of the output light defined by the combination of basis illumination states (e.g., precalibrated basis spectra) to achieve a certain reference or transition illumination state (e.g., calculated spectra). In FIG. 7A, there is shown a simple scenario based on two basis states (or basis spectra) and a linear interpolation therebetween to define a reference or transition illumination state to be achieved (e.g., a calculated spectrum), the illumination state to be achieved being a combination of basis illumination states. FIG. 7B shows an example of three basis states, and FIG. 7C shows an example with five basis states. The calculated illumination states may be found anywhere within the perimeter defined by the basis states. It will however be understood that in some implementations, the calculation of the calculated states (e.g., spectra) may involve extrapolation methods, such that the resulting calculated states may fall outside of the perimeter defined by the reference points. In some implementations the calculated illumination states are included in a calculated state layer, which provides a set of precalculated or predetermined states stored in memory and accessible by method. The set of precalculated or predetermined states can be obtained from basis states stored in memory in a basis state layer, which is generally not accessed during the implementation of the method. Each calculated spectrum in the calculated state layer may be calculated based on a series of weight ratio from the basis states, which can be pre-calculated or predetermined and stored.

The method 100 further includes a step of driving the solid-state light emitters based on the plurality of reference control parameters to generate the dynamic lighting scenario 106 (herein referred as the step of driving 106), see for example FIG. 3C In some implementations, as explained above, the emitters 14 are driven according to a PWM scheme, in which case each set of reference control parameters is embodied by a PWM signal apt to instruct each driver $26_i$ on the PWM current value to apply to the associated emitter $14_i$. Therefore, for each lighting reference point, the corresponding set of reference control parameters causes the emitters 14 to emit light at an intensity such that the resulting combined light beam from all the emitters 14 has the desired spectral contents and intensity corresponding to the associated reference illumination state to be achieved. In implementations using the lighting system 10 of FIG. 3C, the main controller 50 may store calibration data relating different values of light output to a corresponding set of control parameters suitable to provide this output and transmit this information to the local controller 34. In some variants, this communication may be cloud-based. In other variants the calibration data may be locally stored in a memory provided in the lighting system 10. In some variants, a calibration procedure allowing the determination of the calibration data can be performed an any time during the lifetime of the lighting system 10 or the lamp 11. The sets of reference control parameters allow the operation of the lamp to provide the desired light output at a series of specific reference moments over the scenario timeline. It may however be desirable to provide transitions of the light output between these reference moments. Such transitions require driving the emitters 12 using different driving parameters such that the optical characteristics of the light output generate a gradual evolution of the lighting conditions from one lighting reference point to the next, mimicking real life natural lighting conditions.

In some embodiments, the method 100 includes initiating the step of driving 106 the solid-state light emitters only after the step of providing 102 the plurality of lighting reference points in the dynamic lighting scenario and the step of determining 104 the plurality of sets of reference control parameters for the solid-state light emitters have ended. In such embodiments, the dynamic lighting scenario is defined over its entire duration before the generation of the scenario (i.e., before initiating the step of step of driving 106) has begun.

In other embodiments, the method 100 includes initiating the step of driving 106 the solid-state light emitters before the step of providing 102 the plurality of lighting reference points in the dynamic lighting scenario and the step of determining 104 the plurality of sets of reference control parameters for the solid-state light emitters have ended. In such embodiments, some portions of the dynamic lighting scenario (e.g., the reference illumination states and associated reference control parameters at some later reference moments of the scenario) are defined, while the generation of the scenario (i.e., after initiating the step of step of driving 106) has already begun.

Figure 6:
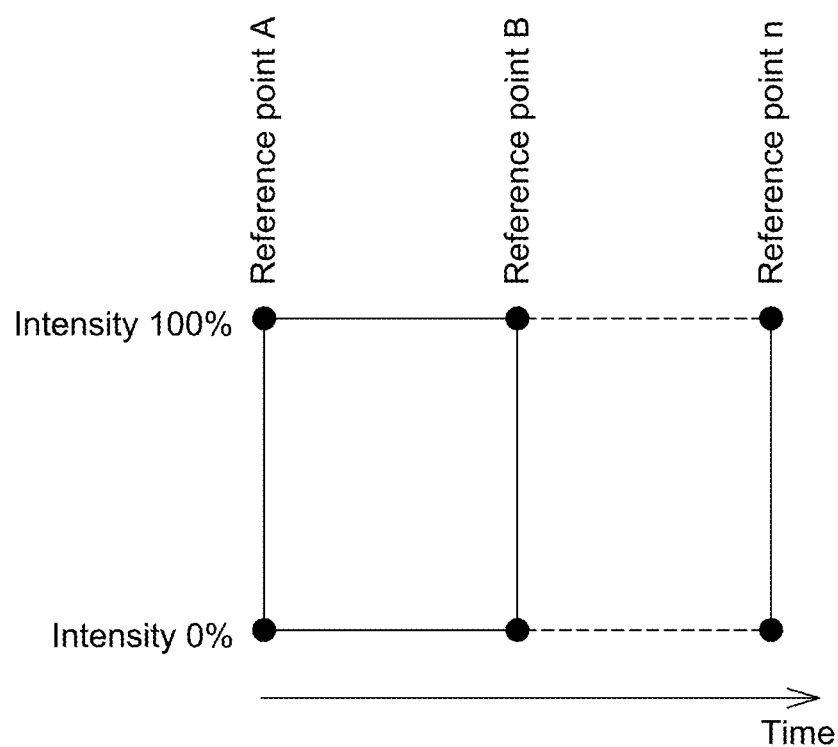
FIG. 6 illustrates how the intensity level of the reference illumination state can be varied at different reference points in a dynamic lighting scenario, in accordance with a possible embodiment.

The lighting reference points can provide markers in an intensity variation space, such as the one shown in FIG. 6. It will be noted that the intensity level of the reference illumination state of each lighting reference point may take any value between 0% and 100%, and that the number of lighting reference points n may be limited only by the storage capacity of related information. A given reference illumination state may be present at more than one instances during a given scenario.

Figure 3D:
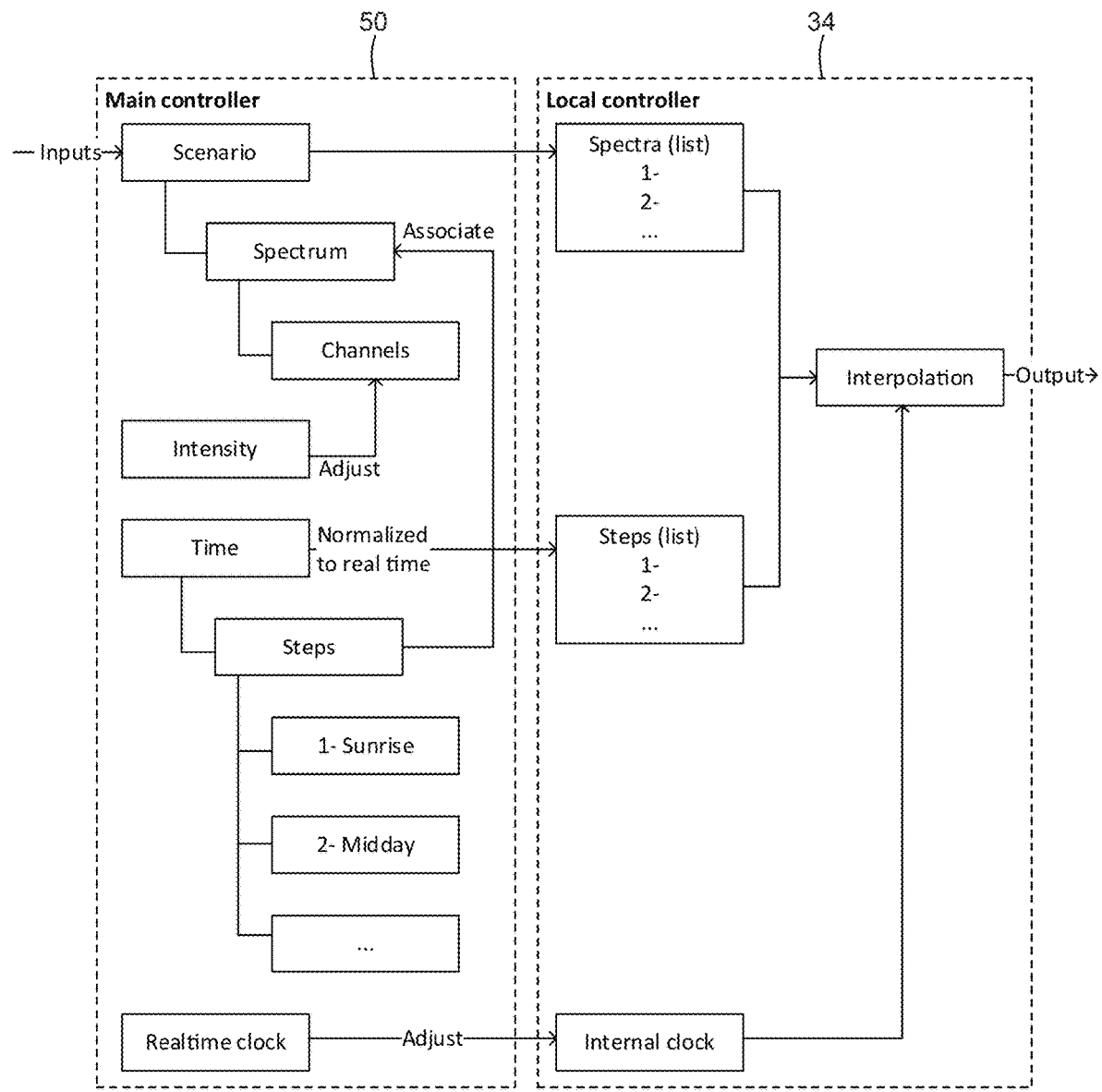
FIG. 3D shows an example of a controller architecture.

Now referring to FIG. 3D, there is shown an example of a controller architecture that may be used to implement the present techniques. In this embodiment, the user provides input to the main controller 50, for example in the form of interactions with the user interface. The inputs may for example be instructions for changing the spectra, the time parameters or simply pinging the local controller 34.

Following this input, the main controller 50 defines a scenario to create, modify or update. This scenario is composed of time steps and associated spectra which are then decomposed into light channels. The channels may for example be defined by an integer between 0 and 4000. The user can also provide as input one or more values for the desired intensity of the generated light. In some implementations. the desired intensity value can enable the modulation of the spectra of a scenario linearly. The modulation scales all channels values to an appropriate percentage of the overall intensity. This may for example be understood as the equivalent of a dimmer function.

The user may also enter several time references including the start of the day, the end of the day, the duration of a sunrise, the duration of a sunset, and the like. The main controller 50 builds the corresponding timeline and cuts this timeline into waypoints that are used to iterate from one state of the emitters 14 to another (e.g., iterate from spectra A to spectra B in 3 seconds). These self-contained sections, also referred to as time steps, are used to define which spectrum the lighting system displays at a given reference moment of the scenario timeline (e.g., at a given time of the day). By associating multiple spectra to different time steps, a scenario may be obtained.

The main controller 50 synchronizes the local controller 34 periodically to ensure the accuracy of the scenario in an internal clock according to its RTC (real time clock). An RTC is an electronic component that maintains an accurate time by calculating how much time it loses per million of ticks (or another suitable value of ticks). The local controller 34 may uses time steps and channel values as spectra. With these data, the local controller 34 can perform interpolations and change from one spectrum to another in a gradual and iterative way.

In some embodiments, the method 100 includes a step of modifying, while the scenario is generated, at least one upcoming characteristic of the dynamic lighting scenario associated with a future time or time period within the scenario timeline. In some embodiments, this modification is based on weather forecast data. In some embodiments, the upcoming characteristics include a number of remaining reference moments of the scenario timeline, a remaining duration of the dynamic lighting scenario, and a reference illumination state to be achieved at a future reference moment.

Events

The method can include a step of momentarily driving the solid-state light emitters to generate at least one event during the dynamic lighting scenario. Such an event introduces a transient perturbation in the dynamic lighting scenario.

These transient perturbations are time periods generally shorter than the entire scenario during which the characteristics of the generated light are modified (i.e., different) from the natural progression of light during the dynamic lighting scenario. For example, and without being limitative, an even could be a few seconds, or as long as a few hours, whereas the lighting scenario could last a whole day. In typical implementations, the events are representative of a weather condition and may mimic transitory phenomena which can affect outdoors light conditions in real life. Other examples include but are not limited to the passage of a cloud or an airplane over the sun, changing meteorological conditions, air pollution and/or similar phenomena.

In some embodiments, the events are generated at a preprogrammed time within the scenario timeline. For example, in some implementations, the lighting characteristics associated to a type of event may be pre-programmed in the local controller 34. Corresponding driving signals could then be sent to the drivers 26 at the trigger time. Alternatively, the events could be generated at a random time within the scenario timeline. Such implementations could be useful to reproduce the changing and/or unpredictable nature of weather or climatic conditions.

In addition to the preprogrammed events and the random events, the method 100 can be adapted such that the generation of the events is manual. It is to be noted that these three types of events (preprogrammed, random and manual) are not mutually exclusive and so can be applied concurrently, if desired and/or needed. It is appreciated that each type of events can be associated with corresponding advantages or can be used to meet certain criteria or objectives.

For example, in the case of preprogrammed or scheduled events, the generation of the events can be used to periodically implement predetermined lighting states or conditions, such as, for example and without being limitative, cloud, lightning and/or other meteorological condition at a precise or predetermined time (hour, minute and second) or time period. This type of event could also be used to make the Sun rise and set every day. In some embodiments, the preprogrammed events are created or generated in the main controller 50 and then sent to the local controller 34 for processing (see FIG. 3C). In the case of random events, it is to be noted that they can vary in quantity, time, shape, frequency and the like. Using this type of events can allow, for example and without being limitative, changing the density of a cloud or other meteorological condition randomly, pseudo-randomly and/or when it appears. For example, a user could set a scenario including approximately five events during it's the scenario timeline. In this example, there could be only four events (out of the five events) in the day, and they will appear at times that are totally random or at least pseudo-random. Other properties could also be changed randomly. For example, the cloud density may be randomly changed, hence modulating the generating light differently for each iteration. This is useful to simulate the hazardous or unpredictable changes of nature and meteorological conditions.

The manual events can be created by the user in real time. These events can happen in real-time or near real-time and can be used to manipulate the light conditions at any given moment. For example, and without being limitative, the system and method may be designed so that it is possible for a user to make a cloud appear instantly by pressing a button. The generation of manual events can be useful to simulate specific weather or meteorological conditions.

Multi-Scenario Recipes

In some embodiments, the method 100 includes a step of generating at least one subsequent dynamic lighting scenario. The dynamic lighting scenario and the subsequent dynamic lighting scenario(s) form a dynamic lighting recipe, which is also sometimes referred to as a "multi-scenario recipe". The subsequent dynamic lighting scenario is typically different from the previous dynamic lighting scenario, but it could alternatively be similar under some circumstances. Indeed, the recipe can be a sequence of similar or substantially similar scenarios, each pair of successive scenarios being separated by a time interval. In this example, the dynamic lighting recipe would include a repetition of the same scenario, with a pause or a hold before the onset of a subsequent scenario. In other implementations, the dynamic lighting recipe is a sequence of different successive lighting scenarios. For example, and without being limitative, a given recipe may aim to reproduce the lighting state or condition at a given location during a predetermined period of time, such as a week, month, season, year or the like. In one implementation, the lighting conditions of a summer where harvest of a particular vegetable was prolific may be reproduced in a greenhouse environment to reap the same benefits. In some embodiments, a daily variation of total illumination time mimicking the lengthening or shortening of days in the real world could be implemented. It will be readily understood that embodiments of the present method and system may be adapted to create any desired recipe using lighting conditions available using the lighting system which has been described, or similar devices or lamps.

In some embodiments, the method can be provided with a step of controlling a lighting system to reproduce several scenarios consecutively (i.e., the "recipe").

In accordance with another aspect of the present description, there is provided a non-transitory computer readable storage medium having stored thereon computer executable instructions that, when executed by a processor, cause the processor to perform a method of controlling a lighting system as described herein.

In the present description, the terms "computer readable storage medium" and "computer readable memory" are intended to refer to a non-transitory and tangible computer product that can store and communicate executable instructions for the implementation of various steps of the method disclosed herein. The computer readable memory can be any computer data storage device or assembly of such devices, including random-access memory (RAM), dynamic RAM, read-only memory (ROM), magnetic storage devices such as hard disk drives, solid state drives, floppy disks and magnetic tape, optical storage devices such as compact discs (CDs or CDROMs), digital video discs (DVD) and Blu-Ray™ discs; flash drive memory, and/or other non-transitory memory technologies. A plurality of such storage devices may be provided, as can be understood by those skilled in the art. The computer readable memory may be associated with, coupled to, or included in a computer or processor configured to execute instructions contained in a computer program stored in the computer readable memory and relating to various functions associated with the computer.

In accordance with another aspect of the present description, there is provided a computer device for use with a lighting system, the computer device including a processor and a non-transitory computer readable storage medium operatively coupled to the processor and having stored thereon computer readable instructions that, when executed by a processor, cause the processor to perform various steps of the methods disclosed herein.

The processor may implement operating systems, and may be able to execute computer programs, also generally known as commands, instructions, functions, processes, software codes, executables, applications, and the like. It should be noted that the term "processor" should not be construed as being limited to a single processor, and accordingly, any known processor architecture may be used. In some implementations, the processor may include a plurality of processing units. Such processing units may be physically located within the same device, or the processor may represent processing functionality of a plurality of devices operating in coordination. For example, the processor may include or be part of: a computer; a microprocessor; a microcontroller; a coprocessor; a central processing unit (CPU); an image signal processor (ISP); a digital signal processor (DSP) running on a system on a chip (SoC); a single-board computer (SBC); a dedicated graphics processing unit (GPU); a special-purpose programmable logic device embodied in a hardware device, such as, for example, a field-programmable gate array (FPGA) or an application-specific integrated circuit (ASIC); a digital processor; an analog processor; a digital circuit designed to process information; an analog circuit designed to process information; a state machine; and/or other mechanisms configured to electronically process information and to operate collectively as a processor.

Example of an Implementation

Figure 8:
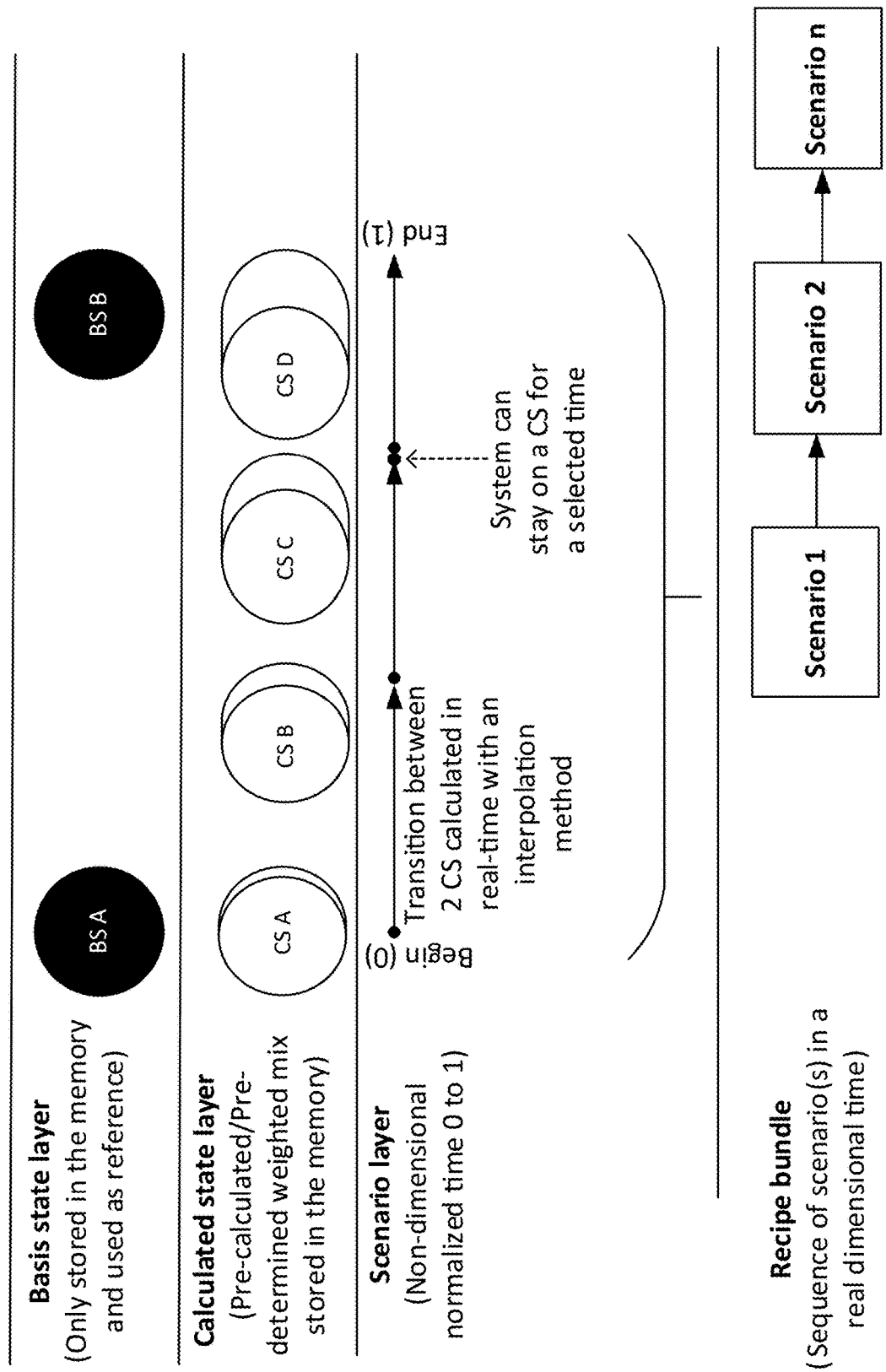
FIG. 8 illustrates an embodiment of a method for generating a dynamic lighting scenario over a scenario timeline.

Referring to FIG. 8, an implementation of a method for generating a dynamic lighting scenario over a scenario timeline is illustrated.

In the illustrated embodiment, the lighting reference points are provided and associated with associated reference illumination states to be achieved. Basis illumination states (e.g., basis spectra) are initially stored in a non-volatile memory, for example in a basis state layer of the memory. The stored basis illumination states can be used to build the reference and transition illumination states defining the dynamic lighting scenario. For example, and without being limitative, the basis illumination states can allow recreating light having a desired or predetermined spectral content at a given moment. Examples two basis illumination states are referred to as "BS-A" and "BS-B" in FIG. 8. A typical reference lighting reference point may be associated with or contains information to precisely recreate a given illumination state or spectral content. The basis illumination states can be used and combined to create the reference and transition illumination states forming the dynamic lighting scenario. In some embodiments, the reference and illumination states are calculated spectra (CS) obtained from the combination of at least two basis spectra. Examples of such calculated states used as reference illumination states are illustrated in FIG. 8, wherein these states are here labeled "CS-A", "CS-B", "CS-C" and "CS-D" and illustrated as being pre-calculated or pre-determined weighted mix stored in the memory. In some embodiments, these calculated or derived states or spectra may be created using a combination of weighted basis spectra. For example, the spectrum CS-B may be defined as a mix of a 23% contribution of RS-A and a 77% contribution of RS-B. Of course, any other mixes could also be attained, depended on the illumination state(s) to be achieved. Suitable transitions between the calculated reference illumination states CS-A, CS-B, CS-C and CS-D can be defined as described above.

The calculated spectra may be used to create a desired or predetermined scenario. Each scenario defines a specific or distinct spectral route of the generated light. In the illustrated embodiment of FIG. 8, the route is defined in the normalized temporal domain, the time is not associated with a unit and simply normalized between 0 and 1, where 0 marks the beginning of the scenario and 1 marks the end of the scenario. In some implementations, a calculated transition spectrum may be viewed as the equivalent of an intermediate waypoint or marker that the spectral contents of the generated light should pass through to reach a destination (i.e., a given reference illumination state). In some embodiments, the spectral route is limited by the colorimetric space whose boundaries are defined by the basis spectra prestored in the non-volatile memory.

In some implementations, after mapping a given spectral route, the present method involved providing the lamp or lighting system with the basis spectra which provide the colorimetric space where the lamp or lighting system evolve over time. The method may then involve defining the calculated spectra that have a limit role inside the colorimetric space. Successively linking these calculated spectra provides a representation of a desired spectral route.

It will be noted that for a given colorimetric space, a plurality of routes may exist based on a same set of basis spectra and calculated spectra. It is therefore possible to recreate a non-limited number of calculated spectra from a small number of basis spectra. The quantity of the spectral routes created may be unlimited.

It is to be noted that, under some circumstances, the spectral representation of a calculated spectrum can require less memory space than a basis spectrum. It may then be desired, in these circumstances, to use this property and integrate this notion to a lighting system or similar devices that may have limited memory space. In some embodiments, basis illumination spectra, dynamic lighting scenarios, recipes, and other control parameters can be stored in a non-volatile memory of the controller (e.g., a non-volatile random-access memory). When the lighting system is instructed to generate calculated illumination spectra from one or more of the stored basis illumination spectra, the lighting system may be configured to load a copy of control parameters stored in the non-volatile memory, wherein all required calculations are realized. Then, the information loaded from the non-volatile memory may be pushed back in the non-volatile memory only if a parameter (e.g., related to a scenario, recipe, or a basis spectrum) has been changed and if the controller has received a recording request, for example from a user. The duration over which the information is kept in the non-volatile memory depends on the type of technology used, as can be appreciated by the skilled person.

A spectral route may be defined inside a scenario. The evolution of the route can be performed in the temporal domain, but this domain may be non-dimensional, for example normalized between 0 and 1, as it has been previously mentioned. In such a scheme, a scenario would always begin at 0 and end at 1. The temporal scale could become dimensional when the scenario is incorporated in a recipe. By the way of example, the scenario #1 may be one hour long. This function allows a recipe to use a same scenario more than only once with the liberty at each time to have a different duration. The sequencing of the scenarios may also be defined at the recipe level. Finally, a recipe may include one or a plurality of scenarios and each scenario may have their own execution time.

Of course, numerous modifications could be made to the embodiments described above without departing from the scope of the appended claims.

The invention claimed is:

1. A method for generating a dynamic lighting scenario over a scenario timeline using solid-state light emitters, the method comprising:
  providing a plurality of lighting reference points in the dynamic lighting scenario, each lighting reference point having an associated reference illumination state to be achieved at a corresponding reference moment of the scenario timeline;
  determining a plurality of sets of reference control parameters for the solid-state light emitters, each set of reference control parameters for producing the reference illumination state associated to a corresponding one of the plurality of lighting reference points; and
  driving the solid-state light emitters based on the plurality of reference control parameters to generate the dynamic lighting scenario.

2. The method of claim 1, further comprising:
  determining a plurality of set of intervening control parameters for the solid-state light emitters, each set of intervening control parameters for providing transition illumination between the reference illumination states of a corresponding pair of successive lighting reference points of the dynamic lighting scenario; and
  driving the solid-state light emitters based on the plurality of set of intervening control parameters to produce the transition illumination.

3. The method of claim 1, wherein said determining the plurality of sets of reference control parameters for the solid-state light emitters is based on calibration data.

4. The method of claim 1, wherein said determining the plurality of sets of reference control parameters for the solid-state light emitters comprises:
  providing a database mapping a plurality of predefined sets of control parameters for the solid-state light emitters to a corresponding plurality of basis illumination states; and accessing the database and, for each reference illumination state to be achieved:
assessing the reference illumination state to be achieved in view of the plurality of basis illumination states; and
selecting, in view of said assessing, the set of reference control parameters based on the plurality of predefined sets of reference control parameters.

5. The method of claim 4, wherein, for one of the reference illumination states to be achieved, said assessing comprises finding a match between the reference illumination state and one of the basis illumination states, and said selecting comprises using, as the set of reference control parameters for producing the reference illumination state, the predefined set of control parameters corresponding to the matching basis illumination state.

6. The method of claim 4, wherein, for one of the reference illumination states to be achieved, said assessing comprises representing the reference illumination state as a combination of two or more of the basis illumination states, and said selecting comprises selecting, in view of said combination, the set of reference control parameters for producing the reference illumination state based on the plurality of predefined sets of control parameters.

7. The method of claim 1, wherein the reference illumination states are defined by an illumination spectrum, a color temperature, a light intensity, or any combination thereof.

8. The method of claim 1, wherein at least one of the reference illumination states encompasses visible light wavelengths, encompasses non-visible light wavelengths, or is representative of natural light.

9. The method of claim 1, wherein at least one of the reference illumination states is representative of artificial light.

10. The method of claim 1, wherein the dynamic lighting scenario is representative of a diurnal illumination cycle or a portion thereof.

11. The method of claim 1, further comprising initiating said step of driving the solid-state light emitters only after said step of providing the plurality of lighting reference points in the dynamic lighting scenario and said step of determining the plurality of sets of reference control parameters for the solid-state light emitters have ended.

12. The method of claim 1, further comprising initiating said step of driving the solid-state light emitters before said step of providing the plurality of lighting reference points in the dynamic lighting scenario and said step of determining the plurality of sets of reference control parameters for the solid-state light emitters have ended.

13. The method of claim 1, further comprising generating at least one subsequent dynamic lighting scenario different from the dynamic lighting scenario, the dynamic lighting scenario and said at least one subsequent dynamic lighting scenario forming a dynamic lighting recipe.

14. The method of claim 1, further comprising modifying at least one upcoming characteristic of the dynamic lighting scenario associated with a future time or time period within said scenario timeline.

15. The method of claim 14, wherein said modifying is based on weather forecast data.

16. The method of claim 14, wherein said at least one upcoming characteristic comprises a number of remaining reference moments of said scenario timeline, a remaining duration of said dynamic lighting scenario, and a reference illumination state to be achieved at a future reference moment.

17. The method of claim 1, further comprising momentarily driving the solid-state light emitters to generate at least one event during the dynamic lighting scenario, said at least one event introducing a transient perturbation in said dynamic lighting scenario.

18. The method of claim 17, wherein said at least one event is generated at a preprogrammed time within said scenario timeline, generated at a random time within said scenario timeline, or representative of a weather condition.

19. A lighting system for generating a dynamic lighting scenario over a scenario timeline, the lighting system comprising:
an illumination unit comprising multiple solid-state light emitters; and
a control and processing unit configured for:
providing a plurality of lighting reference points in the dynamic lighting scenario, each lighting reference point having an associated reference illumination state to be achieved at a corresponding reference moment of the scenario timeline;
determining a plurality of set of reference control parameters for the solid-state light emitters, each set of reference control parameters for producing the reference illumination state associated to a corresponding one of the plurality of reference points; and
driving the solid-state light emitters based on the plurality of reference control parameters to generate the dynamic lighting scenario.

20. The lighting system of claim 19, wherein the solid-state light emitters comprise light-emitting diodes.

21. The lighting system of claim 19, wherein the solid-state light emitters are part of a lamp, the lamp comprising part of the control and processing unit.

* * * * *